No. 657,917. Patented Sept. 18, 1900.
R. CONRADER.
APPARATUS FOR ACTUATING FLUID UNDER PRESSURE.
(Application filed Jan. 14, 1898.)
(No Model.) 5 Sheets—Sheet 1.

WITNESSES:
Fred Einfeldt
A. L. Jackson

INVENTOR
Rudolph Conrader
BY
J. C. Sturgeon
ATTORNEY

No. 657,917. Patented Sept. 18, 1900.
R. CONRADER.
APPARATUS FOR ACTUATING FLUID UNDER PRESSURE.
(Application filed Jan. 14, 1898.)

(No Model.) 5 Sheets—Sheet 3.

WITNESSES:
Fred Einfeldt
A. L. Jackson

INVENTOR
Rudolph Conrader
BY
ATTORNEY

No. 657,917. Patented Sept. 18, 1900.
R. CONRADER.
APPARATUS FOR ACTUATING FLUID UNDER PRESSURE.
(Application filed Jan. 14, 1898.)
(No Model.) 5 Sheets—Sheet 5.

WITNESSES:
Fred Einfeldt
A. L. Jackson

INVENTOR
Rudolph Conrader
BY J. B. Sturgeon
ATTORNEY

UNITED STATES PATENT OFFICE.

RUDOLPH CONRADER, OF ERIE, PENNSYLVANIA.

APPARATUS FOR ACTUATING FLUID UNDER PRESSURE.

SPECIFICATION forming part of Letters Patent No. 657,917, dated September 18, 1900.

Application filed January 14, 1898. Serial No. 666,729. (No model.)

*To all whom it may concern:*

Be it known that I, RUDOLPH CONRADER, a citizen of the United States, residing at Erie, in the county of Erie and State of Pennsylvania, have invented certain new and useful Improvements in Apparatus for Actuating Fluid Under Pressure; and I do hereby declare the following to be a full, clear, and exact description of the invention, such as will enable others skilled in the art to which it appertains to make and use the same, reference being had to the accompanying drawings, and to the letters of reference marked thereon, forming part of this specification.
This invention relates to apparatus for actuating fluid under pressure; and it consists in certain improvements therein, as will be hereinafter fully described, and set forth in the claims.
More particularly, my invention relates to that class of fluid-actuating devices wherein a motor fluid is used to actuate another fluid by the direct contact of the actuating and actuated fluids, the actuating and actuated fluids having such different properties, especially as to specific gravity, as to prevent the mixing of the fluids to any great extent. In carrying out my invention I utilize two chambers, into which the fluid to be actuated is admitted, and then subject the fluid to be actuated in one of the chambers to the motor fluid under pressure; then cut off the supply of motor fluid, then connect the two chambers, in order that some of the energy remaining in the motor fluid after the stoppage of the supply may be utilized. Preferably my device is arranged to actuate liquids by the action of gases under pressure upon the liquids, and when this is done and the mechanism arranged as just hereinbefore described the expansive force of the gas is utilized in the second chamber after the supply is cut off in the first chamber, or, in other words, the mechanism may be said to compound the gas.
Continuing, my invention comprises a device wherein after the two chambers are connected and the compound effect utilized the supply may be turned into the second chamber in order to increase its efficiency.
My invention further comprises a mechanism whereby the pressure in the second chamber may be again compounded in the first chamber upon the closure of the supply to the second chamber.

The invention, as shown in the drawings, is arranged to be used for raising liquids from Artesian wells, wherein working cylinders or pump-chambers are arranged in stages one above the other and with a continuous connection. I have devised certain devices peculiar to this use of the invention, among which may be mentioned the arrangement of pump-chamber, exit-passage, and valve-float for excluding the motor fluids from the exit-passage.

In the use of this invention for Artesian wells or mines which are numerous in a certain territory, it is particularly desirable that a number of wells or mines be operated from the same source of motor-fluid supply, and it therefore becomes advantageous to arrange a valve device at each well or mine. I have devised a valve mechanism for this purpose which is actuated by the motor fluid itself. This valve device so controls the supply of motor fluid as to effect the application of the motor fluid to the pump-chambers in the manner hereinbefore stated. Preferably this valve device comprises a valve-motor which is actuated by the motor fluid, the motor fluid for the valve-motor being controlled by a valve device contained in the same valve-chamber with the valve device for controlling the fluid for the pumps.

Where wells or mines are in close proximity they may be operated advantageously by grouping several together, all controlled by the same valve mechanism. I have devised a means whereby this manner of coupling up the different wells may be used, if desired.

My invention further comprises an arrangement of the device whereby the motor fluid remaining in any chamber after the closing of the supply and the connection between the chambers may be exhausted to an appreciable extent, so that the remaining fluid-pressure opposing the readmission of fluid to be actuated to the chamber may be reduced as much as possible, so as to facilitate the refilling of the chamber.

I have shown my invention in its preferred form as adapted to the raising of liquids from Artesian wells, as follows:

Figure 9:
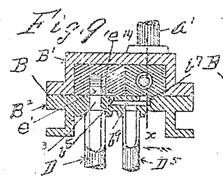
Fig. 9 is a transverse section of the same on the lines $y\,y$ in Figs. 6 and 8.
Figure 12:
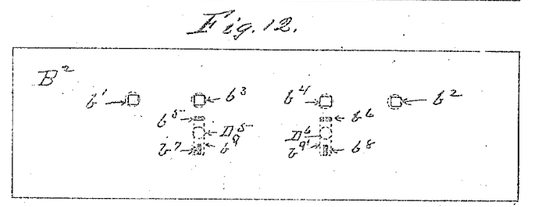
Fig. 12 is a top or plan view of the bottom or valve-seat of the same, showing the arrangement of the ports therein.

In the drawings thus illustrating my invention, A is an air pump or compressor having a suction-pipe $b$ and a discharge-pipe $a$ communicating with a storage-tank $A'$, all of which parts are of ordinary construction. A pipe $a'$ extends from the storage-tank A to and into the top $B'$ of a valve-chest B and is provided with a regulating-cock $a^2$, by means whereof the volume of air or motor fluid admitted to the valve-chest B can be regulated, and the suction or exhaust pipe $b$ extends to the under side of the valve-chest, where it communicates with two ports $b'$ and $b^2$ in the bottom or valve-seat $B^2$ of the valve-chest, and from two ports $b^3$ and $b^4$ pipes D D' extend to conduit-pipes $D^2$ and $D^3$, as clearly shown in Figs. 1 and 7. From two other ports $b^5$ and $b^6$ in the bottom or valve-seat $B^2$ of the valve-chest B (see Figs. 9 and 12) pipes $D^5$ and $D^6$, having regulating-cocks $d\,d'$ therein, (see Figs. 1, 7, 8, and 9) lead to the ends of a cylinder G. (See Figs. 1 and 7.) In the valve-chest B there is a valve E, which is provided at one end with ports $e$ and $e'$, connected by a passage $e^2$ in the valve and adapted to communicate with the ports $b'\,b^3$ in the valve-seat $B^2$, and at the other end of the valve E are ports $e^3$ and $e^4$, connected by a passage $e^5$ in the valve and adapted to communicate with the ports $b^4$ and $b^2$ in the valve-seat $B^2$, and in the central part of the valve there are two ports $e^6$ and $e^7$, connected with a passage $e^8$ in the valve and adapted to communicate during a portion of its traverse with the ports $b^3$ and $b^4$ in the valve-seat $B^2$, and in the face of the bridge $e^9$, between the ports $e^6$ and $e^7$, there is a T-shaped recess $e^{10}$ in the face of the valve, adapted to communicate alternately with the ports $b^3$ and $b^4$ in the valve-seat $B^2$, and from the central part of the T-shaped recess $e^{10}$ there is a lateral passage $e^{11}$, opening out of the side of the valve-face, and from the ends of recess $e^{10}$ and from the ports $e'$ and $e^3$ there are lateral passages $e^{12}$ $e^{13}$ $e^{14}$ $e^{15}$, all of which recesses in the face of the valve being clearly shown in Figs. 7 and 13, the recesses $e^{14}$ and $e^{12}$ in the face of the valve communicating alternately with the port $b^5$ in the valve-seat, and the recesses $e^{13}$ and $e^{15}$ communicating alternately with the port $b^6$ in the valve-seat.

Figure 6:
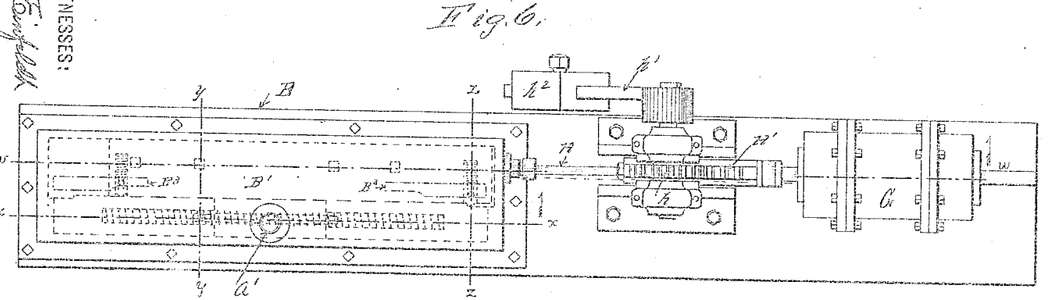
Fig. 6 is a top or plan view of a convenient controlling and reversing valve forming part of the mechanism of my invention.
Figure 10:
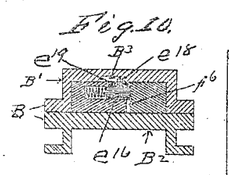
Fig. 10 is a transverse section of the same on the lines $z\,z$ in Figs. 6 and 8.
Figure 11:
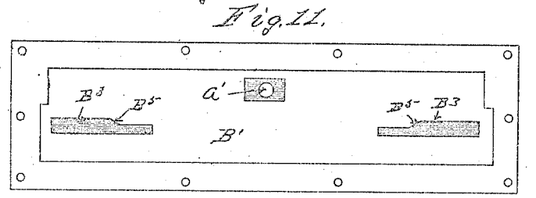
Fig. 11 is a plan view of the under surface of the cover of the valve-chest illustrated in plan view in Fig. 6.
Figure 13:
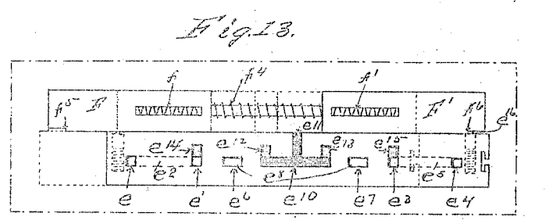
Fig. 13 is a plan view of the under surface of the valves with their movement on the valve-seat shown in dotted lines thereon.

In the valve-chest at the side of the valve E are two auxiliary valves F and F'. (Shown in dotted lines in Fig. 6, in section in Figs. 8, 9, and 10, and in plan view of the under surfaces thereof in Fig. 13.) In the faces of these valves there are slots $f$ and $f'$, the slot $f$ communicating with the port $b^7$ in the valve-seat and with an opening $f^2$ in the inner end of the auxiliary valve F and the slot $f'$ communicating with the port $b^8$ in the valve-seat and with the opening $f^3$ in the inner end of the auxiliary valve F', the ports $b^7$ and $b^8$ communicating, by means of lateral passages $b^9$ and $b^{10}$ within the valve-seat $B^2$, (see Figs. 8, 9, and 12,) with the ports $b^5$ and $b^6$ therein and also with the pipes $D^5$ and $D^6$, (see Fig. 12,) leading to the cylinder G, and between the inner ends of the auxiliary valves F and F' there is a spiral spring $f^4$, which operates to move the auxiliary valves F and F' toward their respective ends of the valve-chest, and in the side of the ends of the valve E there are spring-actuated dogs $e^{16}$, (see Figs. 6, 10, and 13,) adapted to engage shoulders $f^5$ and $f^6$ near the ends of the auxiliary valves F and F' and move said valves alternately toward the center of the valve-chest B. Upon each of the spring-dogs $e^{16}$ there is an arm $e^{18}$, which extends up through transverse slots $e^{19}$ in the top of the ends of the valve E and engage with recesses $B^3$ on the under surface of the valve-chest cover $B'$, as illustrated in Figs. 10 and 11. These recesses $B^3$ are of sufficient width for about two-thirds the length thereof so that the dogs remain in engagement with the auxiliary valves and carry them, with the valve E, toward the center of the valve-chest until the arms $e^{18}$ on the dogs strike the inclined portions $B^5$ of the slots in the valve-chest cover $B'$, when the dogs become disengaged from the auxiliary valves F and F', which are then returned to their normal positions at the ends of the valve-chest by means of the spiral spring $f^4$, one of the auxiliary valves F and F' being thus moved by the valve E at each traverse thereof.

The valve E is provided with a valve-stem $E'$, which connects it with the piston $G'$ in the cylinder G, which is actuated by compressed air alternately passing from the valve-chest B through the pipes $D^5$ and $D^6$ to the ends of the cylinder G, each of these pipes operating alternately as a compressed-air conveying pipe and as an exhaust-pipe, as hereinafter explained. On the valve-stem H there is a rack H', and intermeshing therewith there is a gear-pinion h, on the shaft of which there is an arm h', upon which there is an adjustable weight h². (See Figs. 1, 6, and 7.) The object of this device is that when the piston G' has moved the valve E far enough so that the weight h² is raised to a vertical position, and as soon as the weight h² passes the perpendicular, it falls rapidly by gravity, thereby completing the traverse of the valve, and this operation is repeated at each traverse of the valve in its forward and backward traverse.

Figure 1:
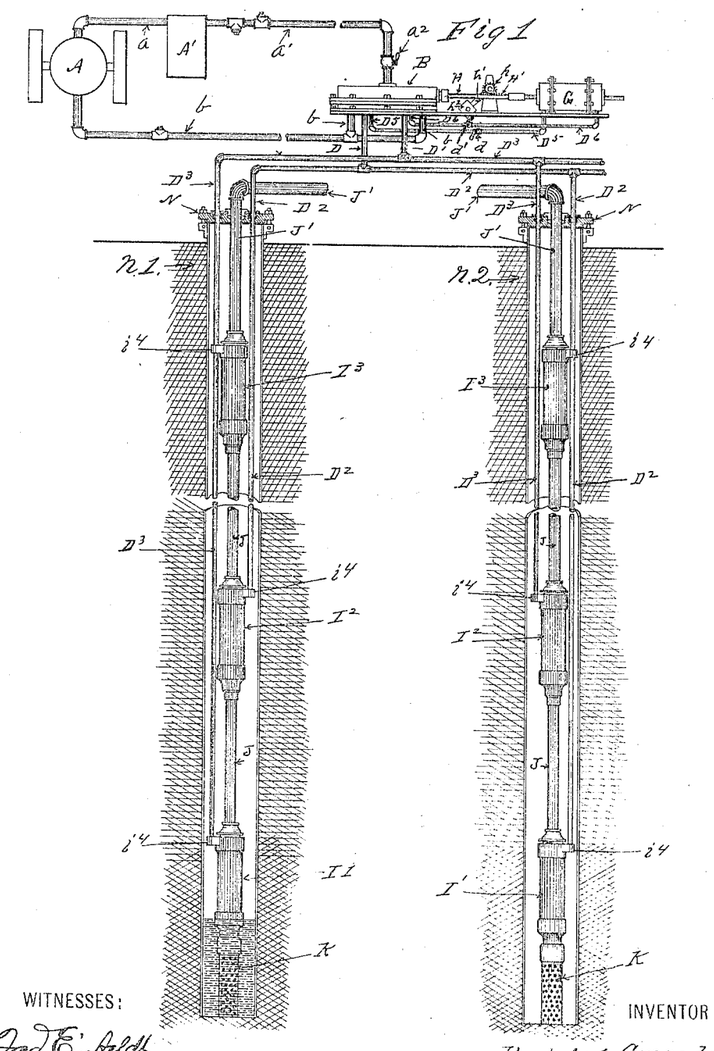
Figure 1 is a view in elevation of a complete apparatus embodying my invention connected with two wells.

In the well or wells I place a series of two or more cylinders I, according to the depth of the well, these cylinders I being connected together by means of pipe-sections J, which, together with the pipe J', extending up out of the well, constitute the conduit through which the fluid is raised out of the well. In Fig. 1 I show two wells, with three of the cylinders I (designated as I', I², and I³) in each well, and in Fig. 2 I show four cylinders I', I², I³, and I⁴, referring to Fig. 2. These cylinders are each constructed with an ordinary ball check-valve i in the lower end thereof, which at the bottom closes the top of the perforated suction-pipe K, and between the cylinders it closes the tops of the tubes leading from the cylinder below. In each cylinder, above the check-valve i, there is a diaphragm operating as a valve-seat i', in the center of which is secured a pipe M, which passes up through a diaphragm i², near the top of the cylinder, where it communicates with the pipe J, extending from the upper end of the cylinder to the bottom of the next cylinder above. Through the diaphragm or valve-seat i' around the pipe M there are openings i³, and around the pipe M there is a vertically-sliding float-valve M', which is raised by the fluid passing up through the openings i³ in the valve-seat i' and is floated up thereby until the fluid passes down out of the openings i³, when it operates to close the openings i³ in the valve-seat i'. In the pipe M, some distance up from the bottom thereof, I place an ordinary ball check-valve m, and in one side of the cylinder, near the top thereof, there is an opening i⁴ for connecting one of the pipes D² or D³ thereto, all of the above-described features being clearly illustrated in Figs. 2, 3, 4, and 5, and as these cylinders and their mechanism are all the same further description thereof is unnecessary. The pipes D and D' connect with pipes D² D³, which pass down into the well through the casing-head N thereof and connect with each alternate cylinder in the well. In Fig. 1 the pipe D' D³ is shown to be connected in well No 1 with the cylinders I' and I³ and in well No. 2 with the cylinder I² only, while the pipe D D² is connected in well No. 1 with the cylinder I² and in well No. 2 with the cylinders I' and I³, and in the well shown in Fig. 2 the pipes D' D³ connect with the cylinders I' and I³ and the pipes D D² connect with the cylinders I² and I⁴. In operation when the pressure of the air from the compressor is exerted through the pipes D' D³ upon the cylinder connected therewith the suction or exhaust pipe is connected with and acts through the pipes D D² upon the cylinders connected therewith to exhaust the air therefrom, and, vice versa, when the pipes D' D³ operate as exhaust-pipes the pipes D D² act as compression-pipes, this change being accomplished by the reversal of the valve E, as hereinafter described.

Figure 2:
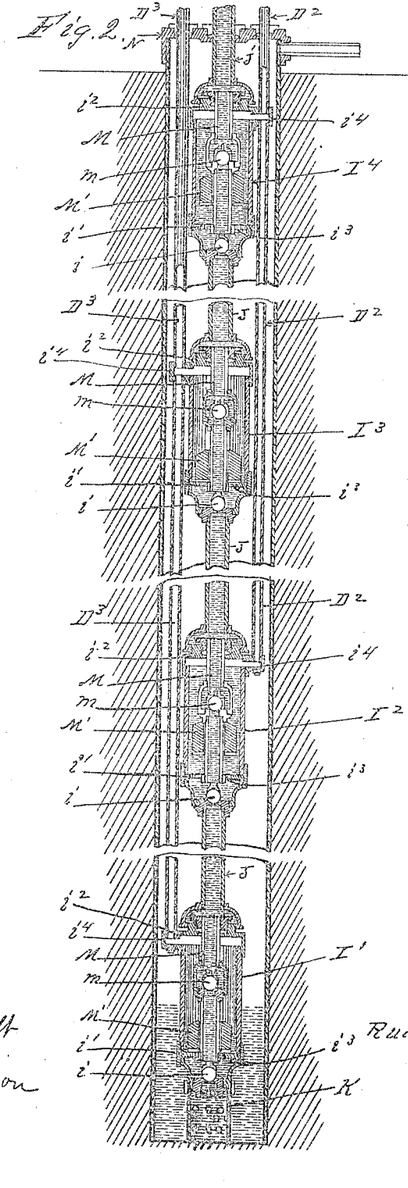
Fig. 2 is a view in vertical section of an Artesian well and apparatus therein embodying my invention.
Figures 3, 4, 5:
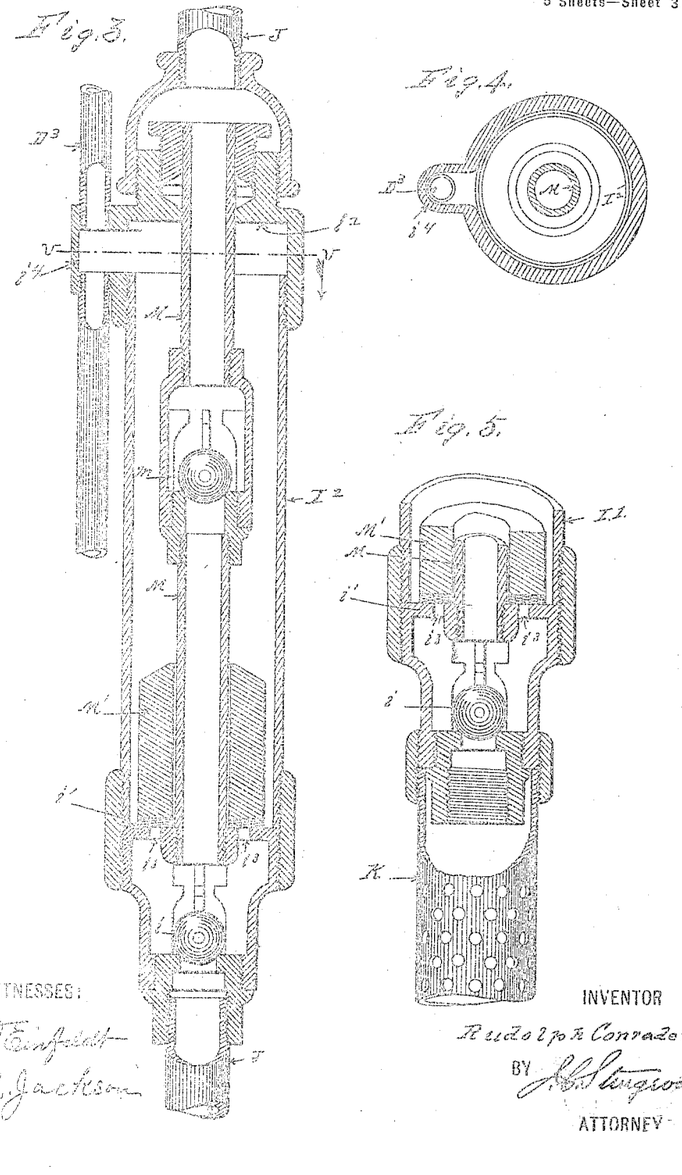
Fig. 3 is an enlarged vertical sectional view of one of the cylinders or pump-chambers in the well.
Fig. 4 is a transverse section of the same on the line $v\,v$ in Fig. 3.
Fig. 5 is an enlarged view of the lower end of the lower cylinder and the suction-pipe connected therewith.

Referring to Fig. 2, it is seen that the cylinders I' and I³ are empty and the cylinders I² and I⁴ full of fluid. Now if exhaust or suction is applied to the pipes D' D³ and pressure to the pipes D D² the cylinder I' will be sucked full of fluid, and at the same time the pressure applied to the cylinders I² and I⁴, with the suction upon the cylinders I³ and I', will transfer the contents of the cylinder I² to the cylinder I³ and force the contents of the cylinder I⁴ out through the discharge-pipe J' and at the same time again fill the cylinder I', and if the pressure be now transferred to the pipes D' D³ and the suction to the pipe D D² the contents of the cylinder I' and I³, which were filled by the first operation, will be transferred to cylinders I² and I⁴, and so on, alternately filling and discharging the cylinders. This changing of the pressure from the one pipe D D² to the pipe D' D³, and vice versa, is accomplished by means of the valve mechanism hereinbefore described.

Figure 7:
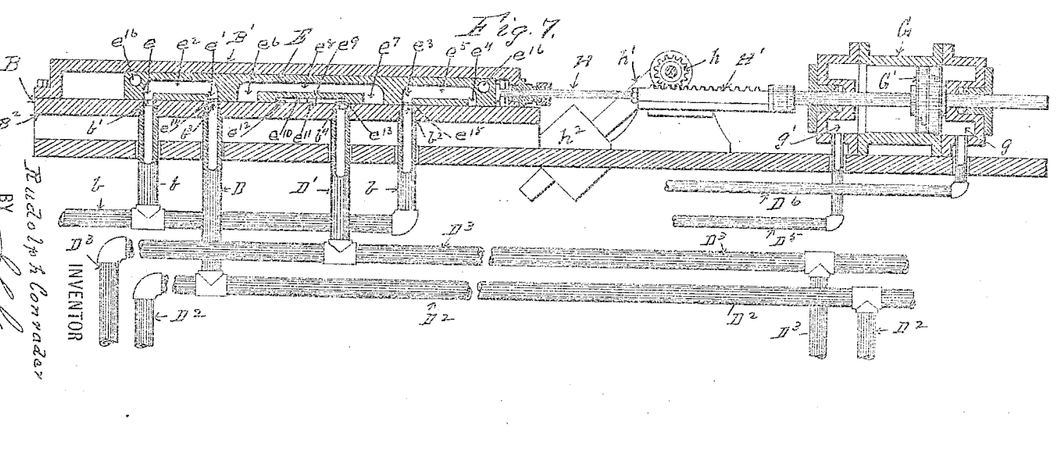
Fig. 7 is a longitudinal section of the same on the line $w\,w$ in Fig. 6 looking in the direction of the arrow.
Figure 8:
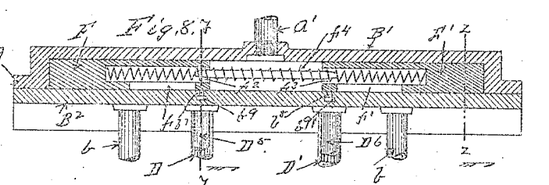
Fig. 8 is a longitudinal section of the same on the line $x\,x$ in Figs. 6 and 9 looking in the direction of the arrow.

By referring to Fig. 7 it will be observed that the ports of the valve E when in the position shown in Fig. 7 show the ports e e' in the valve E as coinciding with the ports b' b³ in the valve-seat B², connecting the suction or exhaust pipe b and the pipes D D² through the passage e² in the valve E, while the pipes D' D³ are connected, through the longitudinal recess e¹⁰ and the lateral port e¹¹ therefrom in the face of the valve E and the port b⁶ in the valve-seat B², directly with the compressed-air supply-pipe a', so that the suction or exhaust pipe b is directly connected with the exhaust, the pipes D D², and the cylinders connected therewith, while the pressure from the compressor A is at the same time exerted directly upon the pipes D' D³ and the cylinders connected therewith. Now as the valve E is moved toward the opposite end of its traverse, when about the middle of such traverse the ports e⁶ and e⁷ therein for a short time coincide with the ports b³ and b⁴ in the valve-seat B², which connects the pipes D and D' through the port e⁸ a sufficient time to permit the pressure in the pipes D D² and D' D³ to become equalized, and as the valve E completes its traverse the ports e³ and e⁴ in the valve coincide with the ports b⁴ and b² in the valve-seat B² and connect the pipes D' D³ with the exhaust-pipe b through the passage $e^5$ in the valve E and the pipes D D² with the compression-supply pipe $a'$ through the lateral port $e^{12}$ therefrom and the longitudinal recess $e^{10}$ in the face of the valve E, which then coincides with the port $b^3$ in the valve-seat B². This valve is automatically operated by the pressure of the air in the following manner: Referring to Figs. 7, 8, 9, 10, 11, 12, and 13, when the valve E is in the position shown in Fig. 7 the end $g'$ of the cylinder G is connected, through the pipe D⁶, the passage $b^5$ in the valve-seat, and the port $b^5$ therein, with the lateral passage $e^{14}$ in the face of the valve and is at this time connected, through the valve-passage $e^3$ and ports $e$ and $b'$, with the exhaust-pipe $b$, so that the air previously in the end $g'$ of the cylinder has exhausted therethrough, and the compressed air is now passing through the lateral passage $e^{13}$ in the face of the valve E into the port $b^6$, (see Fig. 12,) and thence through the lateral passage $b^{61}$ (see Fig. 8) into the pipe D⁶, leading to the end of the cylinder $g$. The compressed air then acting upon the piston G' moves the valve E, which carries the auxiliary valve F' with it toward the center of the valve-chest B. This movement of the auxiliary valve F' as the port $b^6$ closes opens a passage $f''$ in the face thereof to the port $b^8$, through which the compressed air continues to pass to the port $b^8$, the passage $b^8$, and the pipe D⁶ until the valve has traversed approximately two-thirds of its traverse, when the stud $e^{18}$ on the spring-dog $e^{16}$ engages the incline B⁵ in the slot B³ of the valve-chest cover B' and disengages the spring-dog $e^{16}$ from the auxiliary valve F', which is immediately returned to its normal position by the spring $f^4$. Meanwhile the rack H' on the valve-stem H has rotated the pinion $h$ until the weight-arm $h'$ thereon and the weight $h^2$ have passed beyond the perpendicular. The weight $h^2$ then falling over to the opposite side operates to actuate the valve E the remainder of its travel, and the valve E is moved in the opposite direction in the same manner, the action of the compressed air operating through the corresponding ports and pipes to move it in the opposite direction, the same as hereinbefore described.

While my invention has been shown and described as applied to an Artesian well, wherein it is arranged to raise liquid from the well, it will readily be understood that it may be used wherever it is desired to actuate a fluid through the instrumentality of a motor fluid acting directly upon the fluid to be actuated. Thus it may be used without a substantial change for the elevation of liquids from mines or for forcing liquids through substantially-horizontal pipes. The broad features of my invention, especially the compounding feature, may also be utilized for compressing the actuated fluid by means of the motor fluid acting directly upon the fluid to be actuated. This compounding feature in the specific device shown is accomplished by the valve mechanism at the moment the passages $e^6$ and $e^7$ of the valve are brought into register with the ports $b^3$ $b^4$. At this moment the supply is cut off from the first chamber or chambers, and the first and second chambers are connected through the pipes D³ D', port $b^4$, passages $e^7$, $e^5$, $e^6$, port $b^3$, and pipes D D². Succeeding this operation, as will be noted in the specific mechanism shown, the supply is turned into the second chamber after the compounding effect is utilized, whereby the efficiency of the second chamber is raised to that of the first chamber, and, again, the second chamber is cut off from the supply and then connected with the first chamber, whereby the compounding effect is again utilized.

It will be noted that in the application of this device to Artesian wells the pump-chambers are of necessity of very small transverse area. It is desirable to make the lift from the bottom of the well in as few stages as possible and at the same time with the least possible pressure of motor fluid. There are obvious objections to the use of a motor fluid at sufficient pressure to effect a complete lift from deep wells with one pump-chamber. In the application of devices of this character, therefore, to Artesian wells these objections are balanced and as few working pump-chambers or stages used as will permit of the use of a motor fluid under a pressure which can be readily controlled. It is also obvious that there is a lost power with each change in the application of the motor fluid to the alternate pumping-chambers. This loss, of course, is not nearly so great with my device as with devices previously provided for this purpose, because of the compounding effect which is utilized therein. At best, however, there is a loss, so that it is desirable to give to the pump-chambers as great a capacity as possible, so that there will be fewer changes in the application of the motor fluid to the raising of a given amount of fluid. In an Artesian well to increase the capacity the length of the cylinders must be increased, because the walls of the well do not permit of the introduction of larger pump-chambers. As the length of the cylinders is increased it will be readily apparent that the pressure of the motor fluid must be increased sufficiently to effect a lift of the actuated fluid a sufficient additional height to take care of the increase in height in the pump-chamber. From this it will be seen that where this invention is arranged for Artesian wells it becomes a matter of great importance to give to pump-chambers the greatest possible capacity with the least possible length. The successful operation of devices of this character require a valve operated by a float which shall close the exhaust-passage from the pump-chamber in time to prevent the entrance of the motor fluid to the exhaust-passage. The successful operation of these devices when applied to raising liquid from Artesian wells also requires that the exhaust-passages for the liquid shall have a considerable area, in order that the flow of the liquid may not be restricted by reason of the size of the passage. In the device shown I have arranged the float-valve and the exhaust-passage both within the pump-chamber. This allows a transverse area of the pump-chamber substantially equal to the transverse area of the well, so that the pump-chamber may be given substantially a cylindrical shape—that is, one possessing the greatest strength and at the same time having the greatest possible capacity with the least length. In the application of this invention to the raising of liquids from Artesian wells I consider this a very important feature.

The valve actuated by the float is preferably one that is seated by movement in the direction of the fluid through the valve-passage to the eduction-tube. This arrangement subjects the valve to the difference in pressure of the fluid in the chamber and that in the eduction-tube, so that the fluid-pressure is active in effecting the seating of the valve. I have also placed the check-valve $m$ within the body of the cylinder and below the level to which the liquid rises in said cylinder. Where the pump-cylinders are comparatively long, as in Artesian-well practice, this does away with the clearance between the bottom of the check-valve and the entrance to the cylinder, so that the incoming liquid is not opposed by a level of liquid reaching to the check-valve $m$.

It will be noted that the valve-mechanism may be arranged directly at the well or any other place where the pump-chambers are used and that this may be a considerable distance from the source of motor-fluid supply. It will also be noted that the valve mechanism, which is all contained in the same valve-chest, not only controls the supply of fluid to the pump-chambers, but also the supply of fluid to the valve-motor which actuates the valve. By wire-drawing the supply to the valve-motor any desired frequency can be given to the movements of the valve. This may be accomplished by the valves $d\ d'$.

Having thus described a suitable apparatus and mechanism for the practice of my invention, I do not confine myself to the exact mechanism shown and described, as portions thereof may be considerably modified and changed without departing from the spirit of my invention. Therefore,

What I claim as new, and desire to secure by Letters Patent of the United States, is—

1. In an apparatus for actuating fluid under pressure the combination of two pump-chambers arranged to bring a motor fluid and fluid to be actuated into contact with each other within said chambers; connections leading from said chambers to a source of motor-fluid supply; a motor-fluid connection between said chambers; means for admitting a fluid to be actuated to said chambers; means for conducting an actuated fluid from said chambers; and a valve mechanism controlling the movement of motor fluid arranged to open a connection to one of said chambers during a closure of the connection between said chambers, to open the connection between said chambers during a closure of the connections between both chambers and the source of motor-fluid supply, and then to open the connection between the second chamber and the source of motor-fluid supply during a closure of the connection between said chambers.

2. In an apparatus for actuating fluid under pressure, the combination of two pump-chambers arranged to bring a motor fluid and fluid to be actuated into contact with each other within said chambers; a connection leading from said chambers to a source of motor-fluid supply; a motor-fluid connection between said chambers; means for admitting a fluid to be actuated to said chamber; means for conducting an actuated fluid from said chambers; and a valve mechanism controlling the movement of motor fluid arranged to open a connection between a source of motor-fluid supply and one of said chambers during a closure of the connection between said chambers, to open the connection between said chambers during a closure of the connections between both chambers and the source of motor-fluid supply, and then to open the connection between the second chamber and the source of motor-fluid supply and during a closure of the connection between said chambers to open the first chamber to an exhaust during the connection of the second chamber with the source of supply.

3. In an apparatus for actuating fluid under pressure, the combination of two pump-chambers arranged to bring a fluid to be actuated and a motor fluid into contact with each other within said chambers; a suction device; a connection leading from one of said chambers to a source of motor-fluid supply; a connection leading from the said chamber to said suction device; a connection between said chambers; means for admitting fluid to be actuated to each of said chambers; means for conducting the actuated fluid from said chambers; and a valve mechanism for controlling the movement of motor fluid arranged to successively open the connection leading to the source of supply during a closure of the connection leading to the suction device and the connection between said chamber, then to open the connection between said chambers during the closure of the connections leading to the source of supply and the suction device, and then to open the connection leading to the suction device during a closure of the connection leading to the source of supply and the connection between the chambers.

4. In an apparatus for actuating fluid under pressure, the combination of two pump-chambers arranged to bring a fluid to be actuated and a motor fluid into contact with each other within said chambers; a connection leading from one of said chambers to a source of motor-fluid supply; a motor-fluid connection between said chambers said connection being independent of the conducting means for the fluid to be actuated; means for admitting a fluid to be actuated to each of said chambers; a valve device for controlling the movements of motor fluid arranged to open the connection to the motor-fluid supply during a closure of the connection between said chambers and to open the connection between said chambers during a closure of the connection to the source of motor-fluid supply and an automatic means for actuating said valve device.

5. In an apparatus for actuating fluid under pressure the combination of two pump-chambers arranged to bring a motor fluid and fluid to be actuated into contact with each other within said chambers; connections leading from said chambers to a source of motor-fluid supply; a motor-fluid connection between said chambers; means for admitting a fluid to be actuated to said chambers; means for conducting an actuated fluid from said chambers; and an automatically-actuated valve mechanism controlling the movement of motor fluid arranged to open a connection to one of said chambers during a closure of the connection between said chambers, to open the connection between said chambers during a closure of the connections between both chambers and the source of motor-fluid supply, and then to open the connection between the second chamber and the source of motor-fluid supply during a closure of the connection between said chambers.

6. In an apparatus for actuating fluid under pressure, the combination of two pump-chambers arranged to bring a motor fluid to be actuated into contact with each other within said chambers; a connection leading from said chambers to a source of motor-fluid supply; a motor-fluid connection between said chambers; means for conducting an actuated fluid from said chambers; and an automatically-actuated valve mechanism controlling the movement of motor fluid arranged to open a connection between said chambers, to open the connection between said chambers during a closure of the connection between both chambers and the source of motor-fluid supply, and then to open the connection between the second chamber and the source of motor-fluid supply and during a closure of the connection between said chambers to open the first chamber to an exhaust during the connection of the second chamber with the source of supply.

7. In an apparatus for actuating fluid under pressure, the combination of two pump-chambers arranged to bring a fluid to be actuated and a motor fluid into contact with each other within said chambers; a suction device; a connection leading from one of said chambers to a source of motor-fluid supply; a connection leading from the said chamber to said suction device; a connection between said chambers; means for admitting fluid to be actuated to each of said chambers; means for conducting the actuated fluid from said chambers; and an automatically-actuated valve mechanism for controlling the movement of motor fluid arranged to successively open the connection leading to the source of supply during a closure of the connection leading to the suction device and the connection between said chamber, then to open the connection between said chambers during the closure of the connections leading to the source of supply and the suction device, and then to open the connection leading to the suction device during the closure of the connection leading to the source of supply and the connection between the chambers.

8. In an apparatus for actuating fluid under pressure, the combination of two pump-chambers arranged to bring a fluid to be actuated and a motor fluid into contact with each other within said chambers; a valve-chest; connections between said chest and a source of motor-fluid supply and said cylinders; and a valve mechanism in said chest controlling the movements of motor fluid arranged to open and close the connection between one of said chambers and the source of motor-fluid supply during a closure by said valve mechanism of the connection between said chambers and to open the connection between said chambers during a closure of the connection to the source of motor-fluid supply.

9. In combination with an Artesian well or the like, an apparatus comprising two pump-chambers arranged to raise liquid therefrom; said chambers being arranged to bring the liquid to be actuated and a motor fluid into contact with each other within said chambers; a connection leading from one of said chambers to a source of motor-fluid supply without said well; a motor-fluid connection between said chambers a part of said connection extending without said well said connection being independent of the conducting means for the fluid to be actuated; means for admitting the liquid to be raised to each of said chambers; means for conducting the liquid from said chambers; a valve device for controlling the movement of motor fluid arranged to open the connection to the motor-fluid supply during a closure of the connection between said chambers and to open the connection between said chambers during a closure of the connection to the source of motor-fluid supply, said valve mechanism being arranged without said well and an automatic means for actuating said valve device.

10. In an apparatus for raising liquids from Artesian wells, the combination of a series of two or more cylinders, one above the other; tubes connecting said cylinders; an eduction extending from the uppermost cylinder out of the top of the well; check-valves in said connecting-tubes at or near their entrance to said cylinders; check-valves in said connecting-tubes at or near the exhaust ends of said cylinders; two pipes extending down into the well each of which connects with each alternate cylinder therein for alternately conveying air or gas under pressure thereto, and exhausting the same therefrom; and valve mechanism arranged to successively open one of said pipes to a source of supply, close both of said pipes, and then connect said pipes substantially as and for the purpose set forth.

11. In an apparatus for raising fluid from Artesian wells, the combination of two or more cylinders one above the other; tubes concentric with and connecting said cylinders; an eduction extending from the uppermost cylinder out of the top of the well; check-valves in the induction-pipes of said cylinders at or near the lower ends of each of said cylinders; check-valves in the tubes connecting and extending down into the cylinders; pipes extending into the well, each of which connects with each alternate cylinder therein for alternately conveying air or gas under pressure thereto and exhausting the same therefrom; and valve mechanism adapted to alternately connect one of said pipes with air or gas under pressure and simultaneously open the other to the exhaust, and also operating to cut off the supply of air or gas, and while so cut off to equalize the pressure in said pipes for a brief period simultaneously with each reversal of pressure therein substantially as and for the purpose set forth.

12. In an apparatus for raising liquids from Artesian wells and the like, the combination of a pump cylinder or chamber; means for admitting liquid to said chamber; an eduction-tube within the walls of said chamber extending from the top to near the bottom of said chamber; a valve for closing the connection between said eduction-tube and the chamber, said valve being arranged to be seated by a movement in the direction of the flow of the fluid through the valve-passage to the eduction-tube; a float within said chamber arranged to actuate the valve to close the connection between said chamber and the eduction-tube with such a level of the fluid to be actuated as to prevent the entrance of the motor fluid to the eduction-tube; and a connection between said chamber and a source of motor-fluid supply.

13. In an apparatus for raising liquids from Artesian wells and the like, the combination of a pump cylinder or chamber; means for admitting liquid to said chamber; an eduction-tube within said chamber extending from the top to near the bottom of said chamber; a float within said chamber; a valve for closing the connection between said eduction-tube and the chamber, said valve being arranged to be actuated by said float and to be brought to its seat by gravity and to be seated by a movement in the direction of the flow of fluid through the valve-passage to the eduction-tube to close the same with a level of liquid in said chamber above the opening to the exit-tube; and a connection between said chamber and a source of motor-fluid supply.

14. In an apparatus for raising liquids from Artesian wells and the like, the combination of a pump cylinder or chamber; means for admitting liquid to said chamber; an eduction-tube within said chamber extending from the top to near the bottom of said chamber; a check-valve within said eduction-tube and within the body of said chamber below the highest level to which said chamber is arranged to receive incoming liquids, a valve for closing the connection between said eduction-tube and the chamber, said valve being arranged to be seated by a movement in the direction of the flow of the fluid through the valve-passage to the eduction-tube; a float within said chamber arranged to close said valve with a level of liquid in said chamber above the opening to the exit-tube and to open said valve with the incoming liquid; and a connection between said chamber and a source of motor-fluid supply.

15. In an apparatus for raising fluid from Artesian wells, the combination of a cylinder or chamber; an induction-pipe connected with the lower end thereof; a check-valve for closing said induction-pipe against the backward movement of fluid; a diaphragm above said check-valve; a central pipe extending up through said diaphragm and through a diaphragm near the top of said cylinder; openings in the lower diaphragm around said pipe for the passage of fluid; a vertically-moving valve adapted to close the openings in the lower diaphragm; a check-valve in said pipe; a pipe connection to said cylinder below the upper diaphragm therein and an eduction-pipe in the top of said cylinder or chamber, substantially as and for the purpose set forth.

16. In an apparatus for actuating fluids under pressure the combination of a chamber; means for admitting fluid to be actuated to said chamber; means for conducting the fluid actuated from said chamber; a valve-motor; a valve-chest; a connection between said valve-motor and said chest; a connection between said chest and said chamber independent of the connection between the valve-motor and the chest; and a connection between said chest and a source of motor-fluid supply; and valve mechanism contained in said chest and arranged to control the movement of motor fluid to said chamber and to the valve-motor.

17. In an apparatus for actuating fluid under pressure, the combination of a pump-chamber; a valve-motor; a valve-chest; connections between said valve-chest and the pump-chamber, the valve-motor and a source of motor-fluid supply; of a main valve arranged to be actuated by said valve-motor and to control the movement of motor fluid to the pump-chamber; and an auxiliary valve contained in said chest for actuating the valve-motor.

18. In a valve mechanism, the combination of a valve-seat having a series of ports therein, and pipes connected therewith alternately operating as compression and exhaust pipes, with a valve operating on said valve-seat having chambers therein and ports adapted to coincide with the ports in the valve-seat, and operate at one point in its traverse to equalize the pressure in the exhaust and compression pipes, and at another point in its traverse to reverse the pressure in said pipes; a cylinder and piston connected with said valve, said valve-seat and valve also having ports therein adapted to alternately admit compressed air or gas to the ends of said cylinder and exhaust the same, whereby said valve is automatically actuated, substantially as set forth.

19. In a valve mechanism, the combination of a valve-chest; a main valve and two auxiliary valves therein operated by said main valve; a cylinder; a valve-rod connecting said valve with a piston in said cylinder for actuating the same; a rack on the valve-rod; a pinion and an arm and weight operated thereby; pipes from ports in the valve-chest leading to the ends of said cylinder; ports and passages in the valves leading thereto; a pipe leading to said valve-chest for supplying air or gas under pressure thereto; exhaust and pressure-conveying pipes leading from ports in said valve-chest; and ports and passages in said valves communicating therewith, substantially as and for the purpose set forth.

20. In an apparatus for raising fluid from Artesian wells; a valve-chest; a pipe for supplying air or gas under pressure leading thereto; a valve, E, in said chest having ports, $e\ e'$, at one end thereof connected by a passage, $e^2$, and a lateral port, $e^{14}$, in the face of the valve communicating therewith; ports, $e^3\ e^4$, at the other end thereof connected by a passage, $e^5$, and a lateral port, $e^{15}$, in the face of the valve communicating therewith; ports, $e^6$ and $e^7$, connected by a passage, $e^8$, and a central chamber, $e^{10}$, in the face of the bridge separating the ports, $e^6$ and $e^7$, and lateral passages, $e^{11}$ and $e^{12}$ and $e^{13}$, communicating with the chamber, $e^{10}$; a valve-seat, $B^2$, having ports, $b'$, and $b^3$, $b^4$, $b^5$, $b^6$, adapted to communicate with ports in the valve E; two auxiliary valves, F and F', adapted to be actuated by the valve E, and having ports, $f\ f'$, therein adapted to communicate with ports $b^7$ and $b^8$, in the valve-seat, $B^2$; a valve-rod H, connecting the valve E, with a piston, $G'$, in a cylinder, G; a rack, $H'$, on said valve-rod; a pinion, $h$, and arm, $h'$, and weight, $h^2$, operated by the rack, $H'$; pipes, $D^5$ and $D^6$, connecting the ends of the cylinder to a passage, $e^{10}$, in the valve communicating with the ports, $b^5\ b^6\ b^7$ and $b^8$, in the valve-seat; exhaust-pipes, $b\ b$, connected with the ports, $b'\ b^3$, in the valve-seat; and pipes, D D', connected with the ports, $b^2$ and $b^4$ in the valve-seat, substantially as and for the purpose set forth.

21. In an apparatus for raising fluid from Artesian wells, the combination of an air-compressor; a valve-chest; a pipe for compressed air leading from the compressor to said valve-chest; a suction-pipe from said compressor to said valve-chest; pipes leading from ports in said valve-chest to the alternate cylinders; valves in said valve-chest adapted to reverse the pressure and exhaust in the pipes leading to said alternate cylinders, and also operating to cut off the supply of compressed air or gas, and while so cut off, to equalize the pressure therein by connecting said cylinders, to simultaneously equalize the pressure therein; a cylinder and piston for actuating said valves; and pipes leading from ports in said valve-chest to the ends of said cylinder, substantially as and for the purpose set forth.

22. In a valve mechanism, the combination of a valve-chest; a main valve and two auxiliary valves therein operated by said main valve; a cylinder; a valve-rod connecting said valve with a piston in said cylinder for actuating the same; pipes from ports in the valve-chest leading to the ends of said cylinder; ports and passages in the valves leading thereto; a pipe leading to said valve-chest for supplying air or gas under pressure thereto; exhaust and pressure-conveying pipes leading from ports in said valve-chest; and ports and passages in said valves communicating therewith, substantially as and for the purpose set forth.

In testimony whereof I affix my signature in presence of two witnesses.

RUDOLPH CONRADER.

Witnesses:
F. J. BASSETT,
H. J. CURTZE.